(12) United States Patent
Novis et al.

(10) Patent No.: US 11,823,149 B2
(45) Date of Patent: *Nov. 21, 2023

(54) SYSTEMS AND METHODS FOR ATM INTEGRATED CARD FABRICATOR

(71) Applicant: Capital One Services, LLC, McLean, VA (US)

(72) Inventors: Austen Novis, Jamestown, RI (US); Eric Loucks, Tyson, VA (US); Brian Lee, South Riding, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,139

(22) Filed: Jan. 30, 2023

(65) Prior Publication Data

US 2023/0252437 A1   Aug. 10, 2023

Related U.S. Application Data

(63) Continuation of application No. 16/849,701, filed on Apr. 15, 2020, now Pat. No. 11,610,188.

(51) Int. Cl.
  *G06Q 20/10* (2012.01)
  *G06K 7/08* (2006.01)
  *G06K 7/00* (2006.01)
  *G07F 19/00* (2006.01)

(52) U.S. Cl.
  CPC ....... *G06Q 20/1085* (2013.01); *G06K 7/0013* (2013.01); *G06K 7/087* (2013.01); *G07F 19/203* (2013.01)

(58) Field of Classification Search
  None
  See application file for complete search history.

(56) References Cited

U.S. PATENT DOCUMENTS

| | | |
|---|---|---|
| 4,612,413 A | 9/1986 | Robert et al. |
| 4,816,654 A | 3/1989 | Anderl et al. |
| 4,853,522 A | 8/1989 | Ogasawara |

(Continued)

OTHER PUBLICATIONS

Datacard SD260L Card Printers, User's Guide, Jan. 2017, A-6-A-10 (Year: 2017).*

(Continued)

*Primary Examiner* — Kito R Robinson
*Assistant Examiner* — Toan Duc Bui
(74) *Attorney, Agent, or Firm* — HUNTON ANDREWS KURTH LLP

(57) ABSTRACT

Systems and methods provided herein may include a card replacement system. The system may include an automated teller machine in data communication with a server. The automated teller machine may include an input device; a processor; a replacement card storage containing at least one replacement card, wherein the at least one replacement cards may include a magnetic stripe and a chip; a magnetic stripe writer; a chip writer; and an embossing device. The processor may be configured to: receive a replacement card request via the input device; request replacement card information from the server; encode replacement card information onto the replacement card using the magnetic stripe writer and the chip writer; and emboss user information onto the replacement card using the embossing device.

20 Claims, 4 Drawing Sheets

(56) References Cited

U.S. PATENT DOCUMENTS

| | | | |
|---|---|---|---|
| 4,882,474 | A | 11/1989 | Anderl et al. |
| 4,961,142 | A | 10/1990 | Elliott et al. |
| 5,036,461 | A | 7/1991 | Elliott et al. |
| 5,502,765 | A | 3/1996 | Ishiguro et al. |
| 5,917,168 | A | 6/1999 | Nakamura et al. |
| 6,105,013 | A | 8/2000 | Curry et al. |
| 6,199,762 | B1 | 3/2001 | Hohle |
| 6,230,267 | B1 | 5/2001 | Richards et al. |
| 6,298,336 | B1 | 10/2001 | Davis et al. |
| 6,367,011 | B1 | 4/2002 | Lee et al. |
| 6,659,354 | B2 | 12/2003 | Everett et al. |
| 6,745,940 | B1 | 6/2004 | Korst et al. |
| 6,880,037 | B2 | 4/2005 | Boyer |
| 7,043,642 | B1 | 5/2006 | Lisimaque |
| 7,523,495 | B2 | 4/2009 | Johnson |
| 7,882,361 | B2 | 2/2011 | Williams |
| 8,561,894 | B1* | 10/2013 | Mullen ................ G06Q 20/355 705/14.37 |
| 8,630,955 | B2 | 1/2014 | Kurasaki et al. |
| 2003/0004877 | A1 | 1/2003 | Kasasaku |
| 2006/0118615 | A1 | 6/2006 | Dominelli |
| 2007/0226793 | A1 | 9/2007 | Tanabiki et al. |
| 2009/0095809 | A1 | 4/2009 | Naccache |
| 2011/0042403 | A1* | 2/2011 | Martin ................ B65H 5/04 221/124 |
| 2012/0158594 | A1 | 6/2012 | Lu et al. |
| 2013/0124411 | A1* | 5/2013 | Kobres ................ G06Q 40/02 235/379 |
| 2016/0034104 | A1* | 2/2016 | Lee ................ H01L 27/1218 345/173 |
| 2018/0018669 | A1* | 1/2018 | Goldberg ............ G06Q 20/405 |
| 2020/0065787 | A1* | 2/2020 | Kruczek .......... G06Q 20/40145 |
| 2020/0247633 | A1* | 8/2020 | Hoffman ............. B65H 15/016 |

OTHER PUBLICATIONS

LinTech, "F1 1000 Card Dispenser Lintech", YouTube.com, LinTech Enterprises Limited, (Apr. 23, 2017), www.youtube.com/watch?v=IOXcltQUKhk.

CIM, "Plastic Card Embossing Machine Embosser 2000", YouTube.com, CIM USA Inc. (Apr. 10, 2014), www.youtube.com/watch?v=n1PGZAsb3sk.

GJS, "What is UV Printing?" GJS.co, GJS Group Australia, (2019), gjs.co/equipment/methods/uv_printing.

Shah, S. A. Z., "Is it possible to write EMV data into a new blank chip card and what are the requirements fo rthe data writing?" Quora, Software Engineer, Quora.com, (Mar. 21, 2018), www.quora.com/Is-it-possible-to-write-EMV-data-into-a-new-blank-chip-card-and-what-are-the-requirements-for-the-data-writing.

Trotec Laser Inc. "Laser Etching Versus Laser Engraving", Troteclaser.com, Trotec Laser GmbH (2019), www.troteclaser.com/en-us/blog/2018-05-laser-etching/.

Lisimaque, G., et al., "Interoperability and Card Printing", Lisimaque, G., Senior Vice President of Gemplus Corporation, Goyet, C., Director Program Management of Oberthur Card Systems, Diffie, C., Marketing Manager of Schlumberger—Smart Cards, NIST Workshop on Storage and Processor Card-based Technologies, (Jul. 9, 2003), 18 slides.

Triwood1973, "How Credit Cards Are Made", YouTube.com, (Jul. 2, 2009), www.youtube.com/watch?v=gaduUHFrScl&feature=youtu.be&t=288.

"ATM Security Guidelines, Payment Card Industry Data Security Standard, Jan. 2013" (Year: 2013).

Stacey Cowley, "Banks look to Cellphones to Replace ATM Cards", 2017, The New York Times, https://www.nytimes.com/2017/02/13/business/dealbook/banks-look-to-cellphones-to-replace-atm-cards.html (Year: 2017).

\* cited by examiner

SYSTEMS AND METHODS FOR ATM INTEGRATED CARD FABRICATOR

FIELD OF THE DISCLOSURE

The present disclosure relates to systems and methods for automated teller machine integrated card fabricator.

BACKGROUND

When a new or replacement card is required or there is a need to open a new account, the card is mailed to the recipient. However, the card often takes several days to arrive and incurs corresponding costs. Moreover, the hardware required to issue cards is overly complex and card may be subject to interception, thereby rendering the process unsecure.

These and other deficiencies exist. Accordingly, there is a need to provide users with an appropriate solution that overcomes these deficiencies which provides increased security, improved efficiency, and enhanced user interaction experience.

SUMMARY OF THE DISCLOSURE

Embodiments of the present disclosure provide an automated teller machine that may include a card dispenser. The automated teller machine may include a display screen. The automated teller machine may include an input device. The automated teller machine may include a processor. The automated teller machine may include a replacement card storage containing at least one replacement card, wherein the at least one replacement card may include a magnetic stripe. The automated teller machine may include a magnetic stripe writer configured to transfer data to the at least one replacement card. The automated teller machine may include a chip writer configured to transfer data to a chip associated with a replacement card. The automated teller machine may include an internal card conveyor configured to transport the at least one replacement card from the replacement card storage, position the at least one replacement card in the magnetic stripe writer, position the at least one replacement card in the chip writer, and eject the at least one replacement card through the card dispenser after the magnetic stripe writer has transferred data to the magnetic stripe of the at least one replacement card.

Embodiments of the present disclosure provide a method of authenticating card replacement and may include receiving, via input, a replacement card request; authenticating, by a processor, identity of a user based on the input using a first authentication factor; requesting, by the processor, replacement card information based on the authenticated identity; receiving, from the server, replacement card information; transmitting, by a magnetic stripe writer, the replacement card information to at least one replacement card, the at least one replacement card contained in a replacement card storage; and dispensing the at least one replacement card.

Embodiments of the present disclosure provide a card replacement system and may include an automated teller machine. The automated teller machine may include an input device. The automated teller machine may include a processor. The automated teller machine may include a replacement card storage containing at least one replacement card, wherein the at least one replacement card includes a magnetic stripe and a chip. The automated teller machine may include a magnetic stripe writer. The automated teller machine may include a chip writer. The automated teller machine may include an embossing device. The card replacement system may include a server in data communication with the processor. The processor may be configured to receive a replacement card request via the input device. The processor may be configured to request replacement card information from the server. The processor may be configured to encode replacement card information onto the replacement card using the magnetic stripe writer and the chip writer. The processor may be configured to emboss user information onto the replacement card using the embossing device.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

As described herein, systems and methods may be configured to issue new cards for authenticated users at an automated teller machine, allowing them the option to instantly access their accounts. Upon request of a selection of a type of card, the magnetic stripe may be written on the card, and an identification in the chip may be read to be associated with an account. In some examples, the chip and the card may be programmed during card fabrication. In other examples, the card may not be preprogrammed and thereby be fabricated from the beginning in accordance with the personalization process. In addition, the hardware of the automated teller machine may be configured such that the cards are retrieved from storage, transited through various components along a conveyor for fabrication, and are ultimately dispensed. It is understood that the embodiments discussed in the present disclosure are exemplary, and the foregoing examples are non-limiting.

Figure 1:
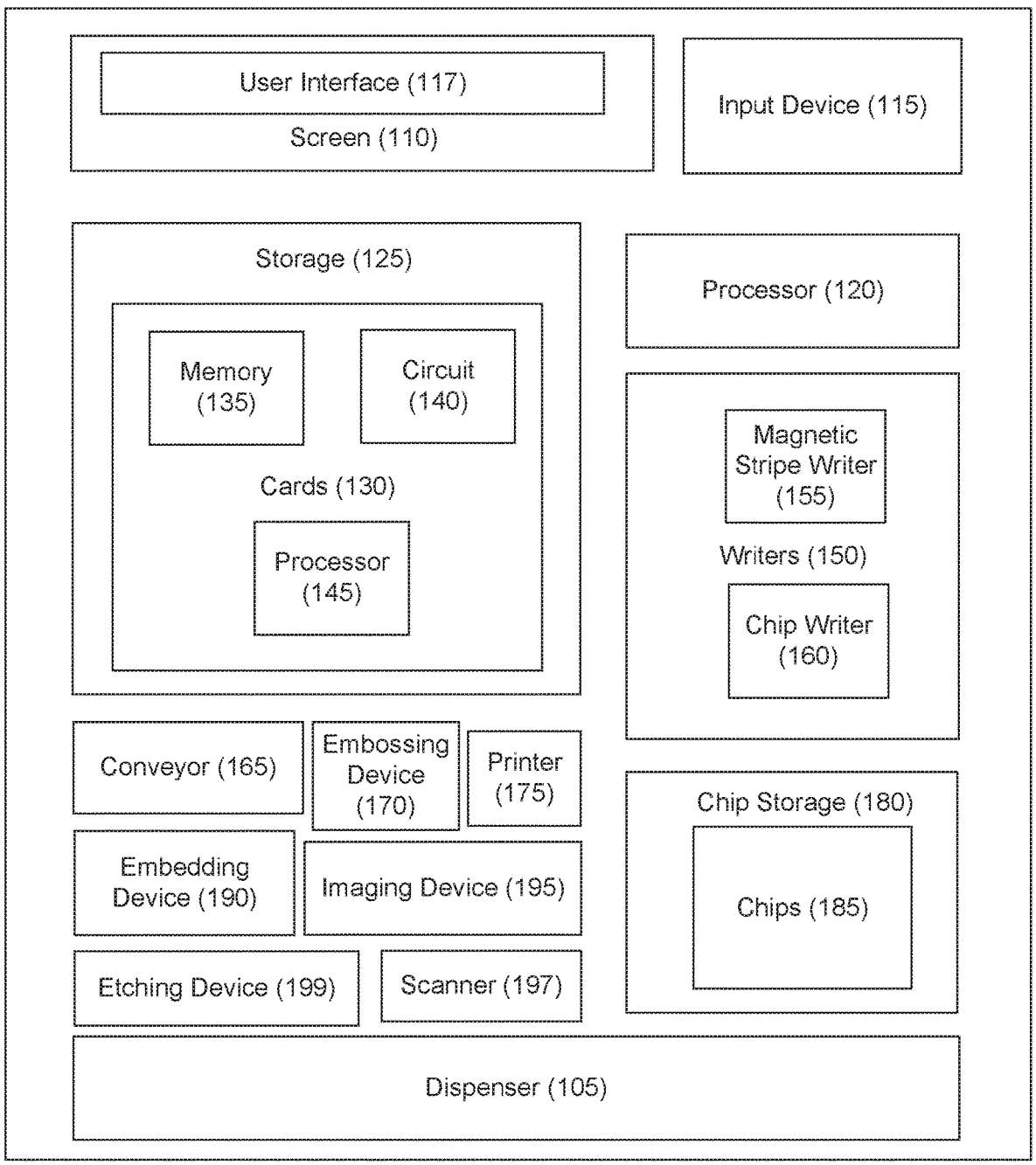
FIG. 1 depicts an automated teller machine according to an exemplary embodiment.

FIG. 1 illustrates an automated teller machine 100 according to an exemplary embodiment. As further discussed below, automated teller machine 100 may include a dispenser 105; a screen 110; an input device 115; a processor 120; a storage 125; one or more cards 130; memory 135; circuit 140; processor 145; one or more writers 150; magnetic stripe writer 155; chip writer 160; conveyor 165; embossing device 170; printer 175; chip storage 180; chips 185; chip embedding device 190; imaging device 195; scanner 197; and etching device 199. Although FIG. 1 illustrates single instances of components of the automated teller machine 100, automated teller machine 100 may include any number or combination of components and be configured to dispense one or more cards 130. As further discussed below, the card 130 may be pre-programmed or not be pre-programmed and thereby require fabrication in accordance with a personalization process prior to dispensing of the card 130 by machine 100. Personalization of the card may include building of the card 130, insertion of chip 185, printing performed by printer 175, embossing by device 170, strip writing by 155, adding an activation sticker, and/or any combination thereof. As a consequence, the card 130 that is dispensed may be personalized and associated with the creation of the card 130 for a specific user.

Machine 100 may include a dispenser 105. In some examples, the dispenser 105 may comprise a card dispenser. Dispenser 105 may be configured to dispense one or more cards 130. In some examples, dispenser 105 may be configured to dispense card 130 via one or more motors such that card 130 may be pushed out in a first direction, such as a lateral direction. By way of example, dispenser 105 may dispense card 130 from storage 125, as discussed below.

Machine 100 may include a screen 110. In some examples, the screen 110 may comprise a display screen that is configured to display data, as further explained below. Machine 100 may include an input device 115. In some examples, machine 100 may include a user interface 117 configured to communicate with the input device 115. For example, the user interface 117 may be configured to receive user identification information and one or more requests from the input device 115. In some examples, at least one of the requests may comprise a card replacement request transmitted from the input device 115. The user interface 117 may be configured to include a haptic panel coupled to screen 110 such that the user interface 117 may receive haptic input. In some examples, user interface 117 may prompt for retrieval of one or more login credentials to authenticate user based on user identification information.

For example, user interface 117 may be configured to receive the one or more login credentials from an application comprising instructions for execution on a client device (not shown). In some examples, user interface 117 may be configured to prompt entry of input to create an account so as to store the user identification information. In some examples, a plurality of authentication factors may be used to authenticate the user identification information. For example, a first authentication factor may comprise validating the one or more login credentials. In some examples, a second authentication factor may comprise validating additional received input, including but not limited to, validating biometric data, challenge-response mechanism, one-time password, and/or any combination thereof. The data used to authenticate the user may be stored in the server and/or one or more databases, which are then retrieved and compared to determine a match.

Machine 100 may include one or more processors 120. The processor 120 may be in data communication with a server (not shown) which is further discussed below. In some examples, the processor 120 may be configured to receive and transmit one or more requests. For example, the processor 120 may be configured to receive one or more requests, including but not limited to a replacement card or a new card request, via the input device 115. The processor 120 may be configured to transmit one or more requests, including but not limited to a data request, to the server. The processor 120 may be configured to receive, from the server, card data. In some examples, the card data may include replacement card data and be responsive to the data request. In other examples, the card data may include new card data and be responsive to the data request. The processor 120 may be configured to transmit the card data to a magnetic stripe writer 155 such that it is transferred to a magnetic stripe of the card 130. In some examples, the processor 120 may be configured to transmit card data to the chip writer 160, as discussed below, which may be configured to transfer the card data to one or more chips 145 associated with the card 130.

Machine 100 may include a storage 125. In some examples, the storage 125 may comprise a card storage, such as a replacement card storage. For example, the replacement card storage may contain one or more cards 130, as further discussed below. In some examples, the replacement card storage may comprise a bin configured to store one or more cards 130 that may be retrieved for dispensing, including but not limited to via dispenser 105.

The one or more cards 130 may comprise a contactless and/or a contact-based card. In one example, the card 130 may comprise a replacement card. In another example, the card 130 may comprise a newly issued card. The one or more cards 130 may comprise a payment card, including but not limited to a gift card, a debit card, or a credit card. In some examples, the one or more cards 130 may comprise an identification card, a transportation card, or a security card. The one or more cards 130 may include a magnetic stripe. The one or more cards 130 may comprise a memory 135 containing a preprogrammed chip identification and one or more circuits 140 operably connected to one or more processors 145. In some examples, the circuit 140 may comprise a near field communication circuit. The one or more processors 145 may be configured to transmit data, including but not limited to transaction data, using the one or more circuits 140. By way of example, card 130 may be same or similar to the dynamic transaction card described in U.S. Publication No. 2016/0307190, the contents of which is herein incorporated by reference. In some examples, each type of card 130 may be associated with one or more privileges. For example, one or more unique privileges may be associated with limited access or permission, such as spending restrictions within a predetermined time, purchasing restrictions associated with merchant and/or merchant type, card utilization within a predetermined time, and/or any combination thereof.

Machine 100 may include one or more writers 150. For example, machine 100 may include a magnetic stripe writer 155. In some examples, the magnetic stripe writer 155 may be configured to transfer card data to a magnetic stripe of the card 130. In some examples, machine 100 may include a chip writer 160. In some examples, chip writer 160 may be configured to transfer data to a chip 145 associated with a card 130.

Machine 100 may include a conveyor 165. In some examples, the conveyor 165 may comprise an internal card conveyor. The conveyor 165 may be configured to transport the at least one card 130 from the replacement card storage 125. The conveyor 165 may be configured to position the at least one card 130 in the magnetic stripe writer 155. The conveyor 165 may be configured to position the at least one card 130 in the chip writer 160. The conveyor 165 may be configured to eject the at least one card 130 through the card dispenser 105 after the magnetic stripe writer 155 has transferred data to the magnetic stripe of the at least one card 130. In some examples, conveyor 165 may comprise a belt that is configured to transport the card 130 from a first component of machine 100 to a second component of machine 100, at first and second respective locations. For example, the belt may comprise a track. Before the card 130 is ready for dispensing by machine 100, and prior to associating the verified card number of card 130 by the server, a member such as a suction-based arm or a physical arm associated with the belt of conveyor 165 may be configured to pick up the card 130 so that it is carried to an appropriate component of machine 100 to perform a corresponding function. For example, the member may be configured to pick up card 130 by drawing in air and release card 130 by stop pulling air and card 130 may be positioned on any component of machine 100. In some examples, the arm may be robotic and/or under robotic control. By way of example, this implementation may include transporting the card 130 along conveyor 165 to a component, such as magnetic stripe writer 155, which is configured to perform magnetic stripe writing of card 130. In another example, card 130 may be transported along conveyor 165 and then picked up by the member and delivered to chip writer 160, which is verified by the server and then deposited by the member and transported along conveyor 165 to printer 175. In other examples, card storage 125 may be configured to drop one or more cards 130 onto any portion of conveyor 165, which may be configured to transit each card 130 to one or more components of machine 100, with or without utilizing the member.

The conveyor 165 may be in data communication with the processor 120. For example, the conveyor 165 may be in data communication with the processor 120 and may be configured to retrieve one of a plurality of types of cards 130 based on the card data received from the server.

Machine 100 may include an embossing device 170. For example, the embossing device 170 may be configured to emboss information, including but not limited to user information onto the at least one card 130. In some examples, the embossing device 170 may be configured as a press for one or more portions, such as one or more different characters, of the user information onto the card 130. Moreover, the embossing device 170 may be configured press the one or more portions where the card is transited along conveyor 165. In one example, the embossing device 170 may be configured to press a first portion of the user information onto a first surface of the card 130. In another example, the embossing device 170 may be configured to press a second portion of the user information onto a second surface of the card 130.

Machine 100 may include a printer 175. For example, the printer 175 may be configured to print one or more images onto the at least one card 130. In some examples, printer 175 may comprise an ultraviolet (UV) printer that is configured to print customer information and/or predetermined patterns. In some examples, the UV printing of the customer information and/or predetermined patterns may take place on only a portion of the card 130. Moreover, the customer information and/or predetermined patterns may be printed on only a portion of the card 130 without removal from machine 100.

Machine 100 may include a chip storage 180. For example, chip storage 180 may comprise a replacement chip storage containing one or more replacement chips 185. Machine 100 may further comprise a chip embedding device 190 configured to embed one or more replacement chips 185 into the at least one card 130. In some examples, card 130 may be prefabricated with chips 185, as explained herein. In such examples, it may not be necessary to embed a replacement chip for chip 185 in card 130.

Machine 100 may include an imaging device 195. For example, imaging device 195 may comprise a camera that is operably connected to the processor 120. The processor 120 may be configured to receive image data captured from the camera 195 and establish a user identity based on the image data. In some examples, imaging device 195 may be configured to receive biometric data including but not limited to at least one selected from the group of facial and/or voice recognition data and fingerprint data. In some examples, the fingerprint data may be obtained from a scanner 197, such as a fingerprint scanner, coupled to processor 120. Upon retrieval of biometric data, processor 120 may be configured to determine identity of the user. As previously discussed, one or more additional factors may be utilized to authenticate the identity of the user. Machine 100 may include an etching device 199. For example, the etching device 199 may be configured to etch one or more images through and/or on one or more surfaces of the at least one card 130 via laser etching. In some examples, the etching device 199 may use one or more motors to etch the one or more images by carbon dioxide laser.

In some examples, card 130 may be pre-programmed such that embossing and/or printing may be performed, for example by 170 and 175, and prior to one or more processes performed by a server (similar to server 240 of FIG. 2) such that machine 100 dispenses a card 130 in accordance with the pre-programmed process. For example, card 130 may be preprogrammed such that it may only require, prior to dispensing by machine 100, one or more parameters, such as cardholder name, expiration date, and/or card verification value before it is read by a server. In this case, server may be configured to retrieve card information and associate the card number of card 130 with one or more user accounts. In addition, the type of card 130, such as a debit card or a credit card, may be a factor taken into consideration for embossing. Since card 130 may be preprogrammed, it may only utilize a limited number of components of machine 100 necessary that are configured to perform any and all of the above-identified features.

In other examples, card 130 may not be pre-programmed and require fabrication such that machine 100 creates a card 130 and ultimately dispenses the card 130 in accordance with the personalization process, as described above with respect to FIG. 1. In some examples, the machine 100 may be configured to perform all functions by each of the components, as explained above in FIG. 1. In other examples, machine 100 may be configured to perform only a portion of the functions by each of the respective components.

Figure 2:
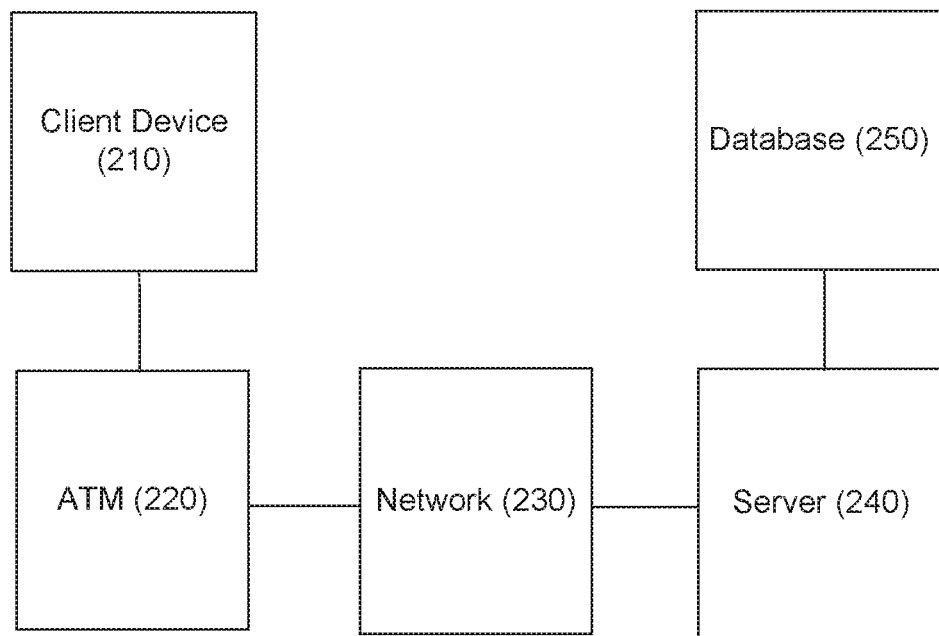
FIG. 2 depicts a card replacement system according to an exemplary embodiment.

FIG. 2 illustrates a card replacement system 200 according to an exemplary embodiment. As further discussed below, system 200 may include client device 210, automated teller machine 220, network 230, server 240, and database 250. Although FIG. 2 illustrates single instances of components of the system 200, system 200 may include any number of components.

System 200 may include a client device 210. For example, client device 210, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 210 device can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 210 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 210 may execute one or more applications, such as software applications, that enable, for example, network communications with one or more components of system 200 and transmit and/or receive data. Client application of client device 210 may be configured to respond to one or more authentication factors requested by at least one selected from the group of ATM 220 and server 240. In some examples, the client application of client device 210 may be configured to transmit one or more responses that are responsive to one or more requests for authentication from ATM 220 or server 240. Client application of client device 210 may be configured to input one or more login credentials requested by ATM 220 or server 240. Client application of client device 210 may be configured to create an account for a user that is responsive to a prompt by ATM 220 or server 240, the prompt associated with account creation so as to assist in user identification.

Client device 210 may be in communication with ATM 220, one or more servers 240 via one or more networks 230, and may operate as a respective front-end to back-end pair with server 240. Client device 210 may transmit, for example from a mobile device application executing on client device 210, one or more requests to ATM 220. The one or more requests may be associated with retrieving data from ATM 220 or server 240. ATM 220 or server 240 may receive the one or more requests from client device 210. Based on the one or more requests from client device 210, ATM 220 or server 240 may be configured to retrieve the requested data from one or more databases 250. Based on receipt of the requested data from the one or more databases 250, ATM 220 or server 240 may be configured to transmit the received data to client device 210, the received data being responsive to one or more requests.

System 200 may include automated teller machine 220. The automated teller machine 220 is explained in further detail with reference to automated teller machine 100 of FIG. 1. The automated teller machine 220 may include same or similar components of automated teller machine 100 of FIG. 1.

System 200 may include a network 230. In some examples, network 230 may be one or more of a wireless network, a wired network or any combination of wireless network and wired network, and may be configured to connect to any one of components of system 200. For example, client device 210 may be configured to connect to ATM 220 via network 230. In some examples, network 230 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 230 may include, without limitation, telephone lines, fiber optics, IEEE Ethernet 902.3, a wide area network, a wireless personal area network, a LAN, or a global network such as the Internet. In addition, network 230 may support an Internet network, a wireless communication network, a cellular network, or the like, or any combination thereof. Network 230 may further include one network, or any number of the exemplary types of networks mentioned above, operating as a stand-alone network or in cooperation with each other. Network 230 may utilize one or more protocols of one or more network elements to which they are communicatively coupled. Network 230 may translate to or from other protocols to one or more protocols of network devices. Although network 230 is depicted as a single network, it should be appreciated that according to one or more examples, network 230 may comprise a plurality of interconnected networks, such as, for example, the Internet, a service provider's network, a cable television network, corporate networks, such as credit card association networks, and home networks.

System 200 may include one or more servers 240. In some examples, server 240 may include one or more processors, which are coupled to memory. Server 240 may be configured as a central system, server or platform to control and call various data at different times to execute a plurality of workflow actions. Server 240 may be configured to connect to the one or more of client device 210, ATM 220, and database 250. Server 240 may be configured to validate received user information and replacement card information and new card information. In some examples, user information may be transmitted from client application of client device 210 or ATM 220 via one or more networks 230 to server 240. In some examples, replacement card information or new card information may be transmitted from client application of client device 210 or ATM 220 via one or more networks 230 to server 240. In some examples, user information and/or replacement card information and/or new card information may be retrieved from database 250 via one or more requests from client device 210, ATM 220, or server 240 via one or more networks 230.

System 200 may include a database 250. As explained above database 250 may be called to retrieve data, including but not limited to user information and replacement card information and new card information. Any data may be requested by client device 210, ATM 220 or server 240 via one or more networks 230. Database 250 may be configured to transmit one or more responses, based on one or more requests from client device 210, ATM 220, or server 240, to client device 210, ATM 220, or server 240. In some examples, database 250 may be configured to communicate with one or more components of system 200.

Figure 3:
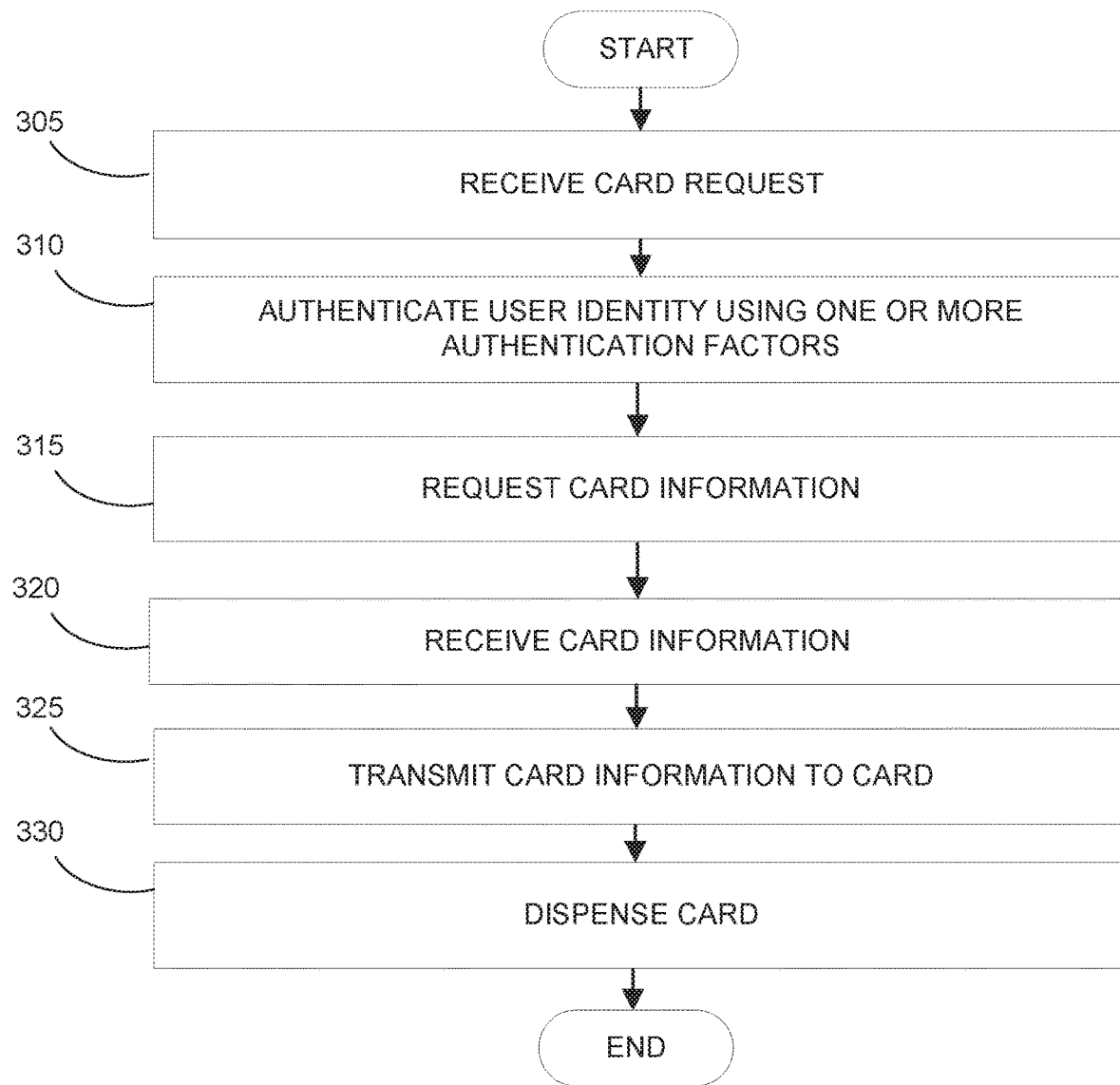
FIG. 3 depicts a method of authenticating card replacement according to an exemplary embodiment.

FIG. 3 illustrates a method 300 of authenticating card replacement. FIG. 3 may reference same or similar components of automated teller machine 100 of FIG. 1, and card replacement system 200 of FIG. 2.

At block 305, the method may include receiving, via input, one or more requests. In one example, a request may comprise a replacement card request. In another example, a request may comprise a new card request. For example, a processor, similar to that of processor 120, may be configured to receive one or more requests, including but not limited to a replacement card request, via an input device, similar to that of input device 115. The processor may be configured to receive one or more requests, including but not limited to a new card request, via the input device.

At block 310, the method may include authenticating, by a processor, identity of a user based on the input using a first authentication factor. In some examples, the method may further include authenticating the identity of the user using a second authentication factor. In some examples, a plurality of authentication factors may be used to authenticate the user identification information. For example, a first authentication factor may comprise validating the one or more login credentials. In some examples, a second authentication factor may comprise validating additional received input, including but not limited to, validating biometric data, challenge-response mechanism, one-time password, and/or any combination thereof. The data used to authenticate the user may be stored in the server and/or one or more databases, which are then retrieved and compared to determine a match. A user interface, similar to that of user interface 117, may be configured to receive the one or more login credentials from an application comprising instructions for execution on a client device. In some examples, the user interface may be configured to prompt entry of input to create an account so as to store the user identification information. For example, the user interface may be configured to receive user identification information and one or more requests from the input device. In some examples, at least one of the requests may comprise a card replacement request transmitted from the input device. In other examples, at least one of the requests may comprise a new card request transmitted from the input device. The user interface may be configured to include a haptic panel coupled to a screen, similar to that of screen 110, such that the user interface may receive haptic input.

In some examples, the method may include capturing data from an imaging device, similar to that of imaging device 195. For example, the imaging device may comprise a camera that is operably connected to the processor. The processor may be configured to receive image data captured from the camera and establish a user identity based on the image data. In some examples, the imaging device may be configured to receive biometric data including but not limited to at least one selected from the group of facial and/or voice recognition data and fingerprint data. In some examples, the fingerprint data may be obtained from a scanner, similar to that of scanner 197, such as a fingerprint scanner, coupled to the processor. Upon retrieval of biometric data, the processor may be configured to determine identity of the user. As previously discussed, one or more additional factors may be utilized to authenticate the identity of the user.

At block 315, the method may include requesting, by the processor, card information based on the authenticated identity. In some examples, the card information may include replacement card information. In other examples, the card information may include new card information. For example, the processor may be configured to transmit one or more requests, including but not limited to a data request, to a server, similar to that of server 240.

At block 320, the method may include receiving, from the server, card information. In some examples, the card information may include replacement card information. In other examples, the card information may include new card information. For example, the processor may be configured to receive, from the server, replacement card data and new card data. The replacement card data and new card data may be responsive to the data request.

At block 325, the method may include transmitting, by a magnetic stripe writer, the card information to the at least one card, the at least one card contained in a replacement card storage. In some examples, the replacement card storage may be similar to that of storage 125. For example, the replacement card storage may contain one or more cards.

In some examples, the one or more cards may be similar to that of card 130 and may comprise a contactless or contact-based card. In one example, the card may comprise a replacement card. In another example, the card may comprise a newly issued card. The one or more cards may comprise a payment card, including but not limited to a gift card, a debit card, or a credit card. In some examples, the one or more cards may comprise an identification card, a transportation card, or a security card. The one or more cards may include a magnetic stripe. The one or more cards may comprise a memory, similar to that of memory 135 containing a preprogrammed chip identification and one or more circuits, similar to that of circuit 140 operably connected to one or more processors, similar to that of processor 145. In some examples, the circuit may comprise a near field communication circuit. The one or more processors may be configured to transmit data, including but not limited to transaction data, using the one or more circuits. By way of example, replacement card may also be same or similar to the dynamic transaction card described in U.S. Publication No. 2016/0307190, the contents of which is herein incorporated by reference. As explained above, each type of card may be associated with one or more privileges. For example, one or more unique privileges may be associated with limited access or permission, such as spending restrictions within a predetermined time, purchasing restrictions associated with merchant and/or merchant type, card utilization within a predetermined time, and/or any combination thereof.

The processor may be configured to transmit the card data to a writer, similar to that of magnetic stripe writer 155, such that it is transferred to a magnetic stripe of the replacement card.

At block 330, the method may include dispensing the at least one card. In some examples, the at least one card may be dispensed via a dispenser. For example, the dispenser, similar to that of dispenser 105, may comprise a card dispenser.

Figure 4:
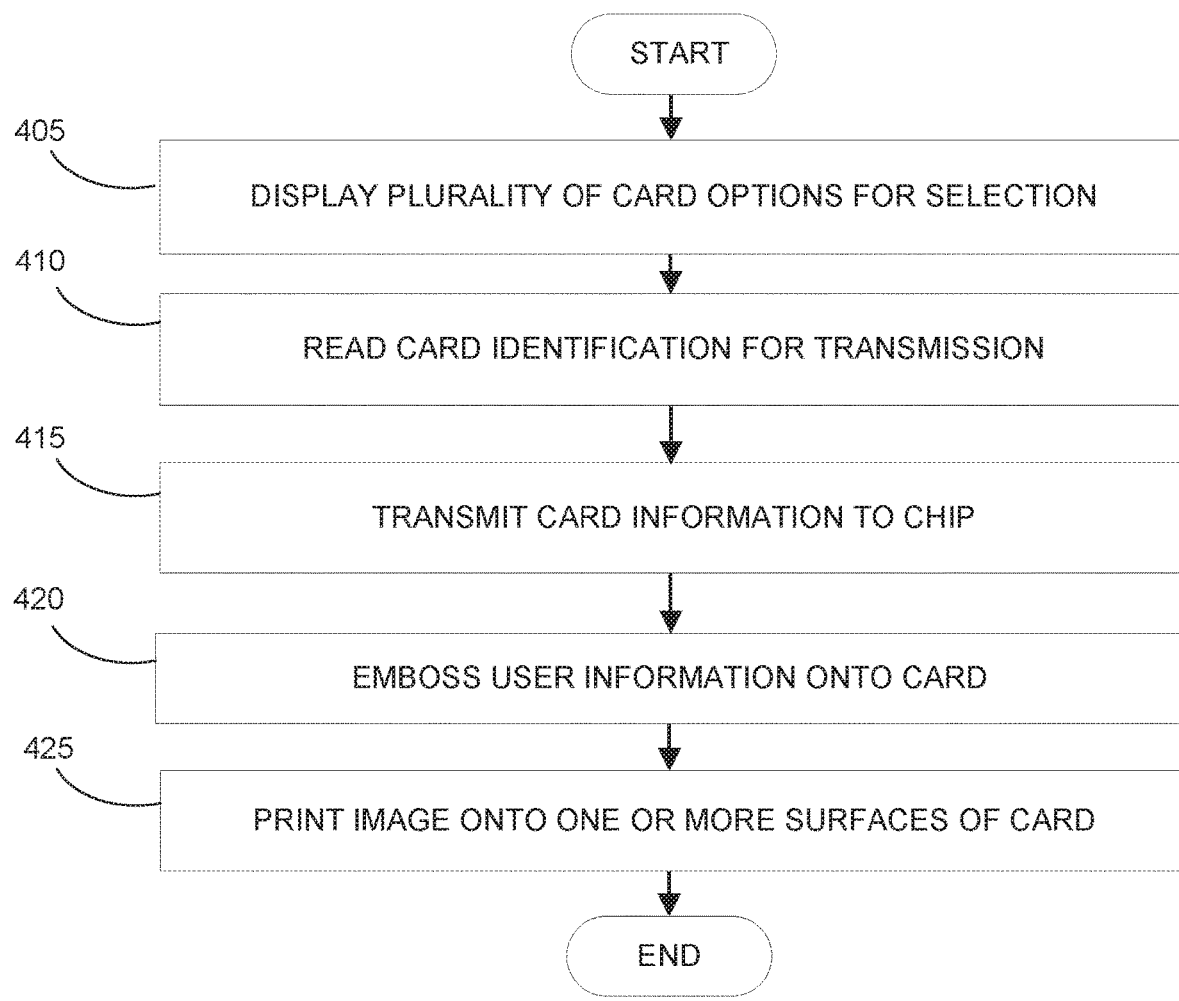
FIG. 4 depicts a method of fabricating a replacement card according to an exemplary embodiment.

FIG. 4 illustrates a method 400 of fabricating a replacement card according to an exemplary embodiment. FIG. 4 may reference same or similar components of automated teller machine 100 of FIG. 1, card replacement system 200 of FIG. 2, and method 300 of FIG. 3.

At block 405, the method may include displaying a plurality of card options and receiving a replacement card selection from the plurality of card options. In some examples, a card option may comprise a replacement card option. In other examples, a card option may comprise a new card option.

At block 410, the method may further include reading a pre-programmed replacement or new card identification from at least one card and transmitting the pre-programmed replacement or new card identification to a server. In some examples, the replacement card identification may be read and transmitted after receipt of replacement card selection. In other examples, the new card identification may be read and transmitted after receipt of new card selection. As previously explained above, the card (similar to card 130) may comprise a replacement card. In another example, the card may comprise a newly issued card.

In some examples, the card may be transported along a conveyor, similar to conveyor 165. For example, the conveyor may comprise an internal card conveyor. The conveyor may be configured to transport the card through various stages as part of the fabrication process. For example, the conveyor may be configured to transport the at least one card from the replacement card storage. The conveyor may be configured to position the at least one card in the magnetic stripe writer. The conveyor may be configured to eject the at least one card through the card dispenser after the magnetic stripe writer has transferred data to the magnetic stripe of the at least one card. The conveyor may be in data communication with the processor. For example, the conveyor may be in data communication with the processor and may be configured to retrieve one of a plurality of types of cards based on the replacement card data or new card data received from the server.

At block 415, the method may further include transmitting, by a chip writer, card information to a chip associated with the at least one card. The conveyor may be configured to position the at least one card in a chip writer, similar to chip writer 160. In some examples, the chip writer may be configured to transfer data to a chip associated with the card. In some examples, the method may include embedding a chip into the card. A chip, similar to replacement chip 185, may be housed in a chip storage, similar to chip storage 180. For example, a chip embedding device, similar to that of chip embedding device 190, may be configured to embed one or more replacement chips into the at least one card. As previously explained, the card may be prefabricated with one or more chips. In such examples, it may not be necessary to embed a replacement chip for chip in card.

At block 420, the method may further include embossing user information onto the at least one card. For example, information may be embossed by an embossing device, similar to that of embossing device 170, including but not limited to user information onto the at least one card. In some examples, the embossing device may be configured as a press for one or more portions, such as one or more different characters, of the user information onto the card. Moreover, the embossing device may be configured press the one or more portions where the card is transited along a conveyor. In one example, the embossing device may be configured to press a first portion of the user information onto a first surface of the card. In another example, the embossing device may be configured to press a second portion of the user information onto a second surface of the card. In some examples, the method may further include etching one or more images through and/or on one or more surfaces of the at least one card. For example, an etching device, similar to that of etching device 199, may be configured to etch one or more images into one or more surfaces of the at least one card via laser etching. In some examples, the etching device may use one or more motors to etch the one or more images by carbon dioxide laser.

At block 425, the method may further include printing an image onto one or more surfaces of the at least one card. For example, a printer, similar to that of printer 175, may be configured to print one or more images onto the at least one card. As explained above, the printer may comprise an ultraviolet (UV) printer that is configured to print customer information and/or predetermined patterns. In some examples, the UV printing of the customer information and/or predetermined patterns may take place on only a portion of the card. Moreover, the customer information and/or predetermined patterns may be printed on only a portion of the card without removal from machine.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A method of fabricating a replacement card, comprising:

requesting, by a processor from a server, replacement card information;

receiving, by the processor from the server, replacement card information;

displaying, by a display screen, a plurality of card options;

receiving, via an input device, a card selection from the plurality of card options;

positioning, by a member, at least one replacement card on a magnetic stripe writer;

transmitting, by the magnetic stripe writer, the replacement card information to the at least one replacement card;

printing, by an ultraviolet (UV) printer, an image onto one or more surfaces of the at least one replacement card;

printing, by the UV printer, at least one selected from the group of customer information and a predetermined pattern; and dispensing, by a card dispenser, the at least one replacement card.

2. The method of claim 1, further comprising:

receiving, by the processor via input, a replacement card request;

authenticating, by a processor, an identity of a user based on the input using a first authentication factor;

requesting, by the processor, replacement card information from the server based on the authenticated identity.

3. The method of claim 2, wherein the input comprises one or more login credentials.

4. The method of claim 2, further comprising authenticating the identity of the user using a second authentication factor.

5. The method of claim 3, wherein the second authentication factor comprises at least one selected from the group of biometric data, a challenge-response mechanism, and a one-time password.

6. The method of claim 1, further comprising transmitting, by a chip writer, replacement card information to a chip associated with the at least one replacement card.

7. The method of claim 1, further comprising etching, by an etching device, an image onto one or more surfaces of the at least one replacement card.

8. The method of claim 1, further comprising etching, by an etching device, an image through one or more surfaces of the at least one replacement card.

9. An automated teller machine (ATM), comprising:

a processor configured to:

request, from a server, replacement card information, and receive, from the server, replacement card information;

a display screen configured to display a plurality of card options;

an input device configured to receive a card selection from the plurality of card options;

a member configured to position at least one replacement card on a magnetic stripe writer the magnetic stripe writer configured to transmit the replacement card information to the at least one replacement card;

an ultraviolet (UV) printer configured to print an image and at least one selected from the group of customer information and a predetermined pattern onto one or more surfaces of the at least one replacement card; and a card dispenser configured to dispense the at least one replacement card.

10. The ATM of claim 9, further comprising a chip writer configured to transfer data to a chip associated with the at least one replacement card.

11. The ATM of claim 10, further comprising an internal card conveyor configured to transport the at least one replacement card from a replacement card storage for positioning by the member on the magnetic stripe writer and the chip writer.

12. The ATM of claim 11, wherein:

the internal card conveyor is configured to retrieve at least one of a plurality types of replacement cards based on the replacement card information, and each type of replacement card is associated with one or more privileges.

13. The ATM of claim 12, wherein the one or more privileges comprises at least one selected from the group of a spending restriction within a predetermined time, a purchasing restriction associated with merchant, a purchasing restriction associated with a merchant type, and a card utilization within a predetermined time.

14. The ATM of claim 11, wherein the internal card conveyor is further configured to eject the at least one replacement card through the card dispenser.

15. The ATM of claim 11, further comprising an embossing device configured to emboss user information onto the at least one replacement card as it is transported by the internal card conveyor.

16. A non-transitory computer-readable medium containing executable instructions that, when executed by an automated teller machine (ATM) comprising a processor, a display screen, an input device, a member, a magnetic stripe writer, and a card dispenser, cause the ATM to perform procedures comprising:

requesting, by the processor from a server, replacement card information;

receiving, by the processor from the server, replacement card information;

displaying, by the display screen, a plurality of card options;

receiving, via the input device, a card selection from the plurality of card options;

positioning, by the member, at least one replacement card on the magnetic stripe writer;

transmitting, by the magnetic stripe writer, the replacement card information to the at least one replacement card;

printing, by an ultraviolet (UV) printer, an image onto one or more surfaces of the at least one replacement card;

printing, by the UV printer, at least one selected from the group of customer information and a predetermined pattern; and dispensing, by the card dispenser, the at least one replacement card.

17. The non-transitory computer-readable medium of claim 16, wherein:

the ATM further comprises a chip writer and an internal card conveyer, and the procedures further comprise:

transporting, by the internal card conveyor, the at least one replacement card from a replacement card storage for positioning by the member on the magnetic stripe writer, and transferring, by the chip writer, data to a chip associated with the at least one replacement card.

18. The non-transitory computer-readable medium of claim 17, wherein:

the procedures further comprise retrieving, by the internal card conveyor, at least one of a plurality types of replacement cards based on the replacement card information, and each type of replacement card is associated with one or more privileges.

19. The non-transitory computer-readable medium of claim 18, wherein the one or more privileges comprises at least one selected from the group of a spending restriction within a predetermined time, a purchasing restriction associated with merchant, a purchasing restriction associated with a merchant type, and a card utilization within a predetermined time.

20. The non-transitory computer-readable medium of claim 17, wherein:
   the ATM further comprises an embossing device, and
   the procedures further comprise embossing, by the embossing device, user information onto the at least one replacement card as it is transported by the internal card conveyor.

* * * * *